United States Patent [19]

Semple et al.

[11] Patent Number: 6,085,177
[45] Date of Patent: Jul. 4, 2000

[54] SYSTEMS FOR ACCESSING THE INTERNET AND GEO-DEFINED DATA AND ASSOCIATED METHODS

[75] Inventors: Deborah K. Semple; William T. Semple, both of Arlington, Va.; Curtis A. Vock, Charlestown, Mass.

[73] Assignee: Civic-DDI, LLC, Boulder, Colo.

[21] Appl. No.: 08/931,626

[22] Filed: Sep. 16, 1997

Related U.S. Application Data

[63] Continuation-in-part of application No. 08/371,425, Jan. 11, 1995, Pat. No. 5,682,525.

[60] Provisional application No. 60/026,125, Sep. 16, 1996.

[51] Int. Cl.[7] .................................................. G06F 17/60
[52] U.S. Cl. ............................... 705/43; 705/42; 705/26; 235/379
[58] Field of Search .................................. 705/21, 26, 42, 705/43; 235/379, 380, 381, 382; 707/104, 9, 10

[56] References Cited

U.S. PATENT DOCUMENTS

| | | | |
|---|---|---|---|
| 4,974,170 | 11/1990 | Bouve et al. | 395/357 |
| 5,046,026 | 9/1991 | Tolomei | 345/473 |
| 5,214,757 | 5/1993 | Mauney et al. | 395/161 |
| 5,289,572 | 2/1994 | Yano et al. | 395/155 |
| 5,424,951 | 6/1995 | Nobe et al. | 364/443 |
| 5,442,567 | 8/1995 | Small | 235/379 |
| 5,450,938 | 9/1995 | Rademacher | 235/381 |
| 5,473,143 | 12/1995 | Vajk et al. | 235/380 |
| 5,543,789 | 8/1996 | Behr et al. | 340/995 |
| 5,649,001 | 7/1997 | Thomas et al. | 379/93.07 |
| 5,734,823 | 3/1998 | Saigh et al. | 395/200.59 |

FOREIGN PATENT DOCUMENTS

97/45796 12/1997 WIPO .

*Primary Examiner*—Tod R. Swann
*Assistant Examiner*—John W. Hayes
*Attorney, Agent, or Firm*—Duft, Graziano & Forest, PC

[57] ABSTRACT

The invention provides internet access through an automatic teller machine. A local processor interfaces with the machine's internal processor to facilitate communication to the World Wide Web. A communication subsystem, e.g., a modem or data communication card, provides for direct coupling to the Internet. Internal memory stores web browsing software and users can initiate web access through commands through a user interface, e.g., a keyboard. The invention further provides for controlling the web access at the banking institution which owns the machine. Individuals withdrawing money, therefore, can be charged for the Internet access time automatically.

11 Claims, 1 Drawing Sheet

SYSTEMS FOR ACCESSING THE INTERNET AND GEO-DEFINED DATA AND ASSOCIATED METHODS

RELATED APPLICATIONS

This application is a continuation-in-part of U.S. application Ser. No. 08/371,425 entitled "System and Methods for Remotely Accessing a Selected Group and a continuation of U.S. Provisional Application Ser. No. 60/026,125, filed on Sep. 16, 1996, each of which are of Items of Interest from a Database," filed on Jan. 11, 1995, now U.S. Pat. No. 5,682,525 and is hereby incorporated by reference.

FIELD OF THE INVENTION

This invention relates to Internet access apparatus. It further relates to accessing geo-defined data, including associated items of interest around a selected area, for users connected to the Internet through any Internet port.

BACKGROUND OF THE INVENTION

Internet usage is growing rapidly. The Internet and the World Wide Web (hereinafter "Web" or "WWW") are used to provide information for a variety of goods and services, associating vendors, agencies and the like to such goods and services. Vendors, for example, are advertising their respective products on Web pages. Likewise, municipal agencies and organizations which sponsor cultural events, e.g., the symphony, are using the WWW to advertise and promote their services and/or functions.

However, there is a need to associate geo-positional information with WWW-advertised goods or services so that users can find the respective agency, vendor and/or organization to purchase and/or utilize such goods and/or services. By way of example, if a sporting goods store has a Web page that advertises a new sale of tennis rackets in a downtown urban city, such information is typically usable only if the users of the Internet can actually locate the sporting goods store at the downtown location. Although the store may or may not include a local address on the Web page, there is generally little positional information locating the store relative to other landmarks or streets within city.

This problem was addressed in U.S. application Ser. No. 08/371,425 entitled "System and Methods for Remotely Accessing a Selected Group of Items of Interest from a Database," filed on Jan. 11, 1995. The application particularly describes techniques for locating a selected category of items of interest in a geographic vicinity and relative to a geo-defined position. For example, a user in downtown Boston can access an Internet port located at point "A" and identify all the locations of sporting goods stores relative to point "A."

This Internet "port" is not, however, readily available to a wide number of users, pedestrians and the like. Users with personal computers (PCs) can of course access the Web through a phone connection and appropriate Internet software, or Web browser; except that most tourists and pedestrians do not carry a portable computer. Further, even if a user carries a portable computer, the location and access to an active phone jack and phone connection is also not readily available. Certain hotels and airlines with traveler clubs do offer connectivity to the Web; however the vast majority of users are simply unable to connect to the Web via a convenient Internet "port."

There is, therefore, the need to provide access to the Internet which is convenient to many users and not just to those, for example, (a) who have portable PCs and a live phone line, (b) who "borrow" a connected Web port from a facility such as a hotel or Internet cafe, and (c) who connect to the Web via a PC satellite uplink. Rather, a Web port is needed which provides convenient access to many users, particularly in the vicinity of those who advertise on the Web, so that these users can have real-time information and geo-definition associated with the Web page, including, for example, a vendor's geographic location, the types of products and services offered by the vendor, and any associated advertising and business information that could be of interest to the user.

Once an individual gains access to the Web, other problems exist. For example, many users are constrained by the data bandwidth of the Internet connection and of the telephone wires connecting the user to the Web site. More particularly, analog phone lines are generally limited to about 28.8 kbs due to the limited bandwidth of twisted-pair phone wire. Digital systems, such as ISDN, and Local Area Networks (e.g., Ethernet) provide enhanced data throughput capability. Nevertheless, users of the Internet will still desire, at times, information at a greater throughput. For example, basic access through ISDN can provide 64 kbps transmission rates, so a typical JPEG compressed digital image of 100 kilobytes takes about 12.5s to transmit. Many users would prefer to receive this JPEG at a faster rate so that viewing can occur in near real-time.

Even though most users desire faster Internet throughput, still other individuals receive information too fast as compared to their ability to receive and to recognize Web information with cognizance. By way of example, some users at a bank withdrawal machine, i.e., an "ATM", are overwhelmed by the speed of the information presented to the ATM user. Similarly, users of the Internet are sometimes overwhelmed by the data and information presented at the user's screen terminal.

Therefore, there is a need to enhance or improve the speed of data transmitted over the Internet, if needed. There is the further need to regulate the flow of information to selected users depending upon their ability to grasp the Internet information flow. It is still another need to provide broader Internet access to those users who communicate in different languages.

The prior art Web access software is also not readily suitable for users who communicate in a language that is different from the instructions and/or Web pages shown and displayed at the access location.

It is, therefore, one object of the invention to provide convenient Web access apparatus which alleviates some of the known problems with Internet access.

Another object of the invention is to provide methods for regulating information to and from users of Internet ports.

These and other objects of the invention will be apparent from the description which follows.

SUMMARY OF THE INVENTION

In one aspect, the invention provides Internet access apparatus that co-exists, and/or operates in conjunction with ATM machines. The United States currently has over 80,000 ATM machines. Typically they are located in, or near to, heavily traveled pedestrian traffic, such as at the mall or in the shopping district of a city. They also typically reside in airports, train stations, and in business and tourist centers. In accord with the invention, ATM machines are modified, or manufactured, to include Web access capability. As such, the ATM systems of the invention typically include (a) a display, (b) an on-line communication sub-system, (c) a user interface, (d) an on-line connection to a communication network, (e) Web access software, (f) one or more data processors capable of handling communication between the Internet and the user interface, and of controlling-ATM transactions, including Internet access commands via the user interface, and (g) supporting structure and/or firmware needed to operate an ATM machine.

As used herein, a "display" means a computer monitor, an ATM monitor (such as those monitors already available at the ATM machine to inform the user of ATM transactions), an LCD display, LEDs, a CRT, and other display systems which provide visual detail of Web pages through the Internet as represented at the ATM. The display should also be generally capable of providing normal ATM transactional information such as known in the art.

As used herein, an "on-line communication sub-system" means a modem, an Ethernet port, a network port to a LAN or WAN (local area network or wide area network, respectively), data terminal equipment (DTEs), mixtures thereof, and other sub-systems and components which provide data communication and data links between computers and computer networks, telephone systems, telegraphs, satellite relays, fiber optic data lines, and the like. Specifically, an "on-line communication sub-system" should facilitate communication between the ATM machine and the Internet or WWW.

As used herein, a "user interface" means a key pad, a touch pad, a computer terminal, a keyboard. The user interface can further include a voice recognition sub-system which converts human voice to data capable of being operated on by the Internet access apparatus so as to communicate over the Internet. For example, a user can walk up to the Internet access apparatus and say "Internet please. Please search for bus stations near to this location." The apparatus, in the selected "voice" mode, responds accordingly, such as "The bus station is located two blocks from here. Turn around and face away from the ATM machine. Turn right and walk one block. Turn left and walk one block. The bus station is on your left. Today there is a special at McDonald's at the bus station: two whoppers for the price of one." This voice interaction is of beneficial use, particularly to the blind or visually impaired community.

As used herein, an "on-line" connection means a live telephone connection, a computer network, the Ethernet, a T1 connection, ISDN, cable-TV, and other connections such that information can be distributed to and from the ATM system and external computers, Web sites, databases and the like.

As used herein, "Web access" software means software such as Netscape™, Microsoft Explorer™, and the like. Those skilled in the art will appreciate that these software packages are likely to change and/or be replaced by other software to facilitate manipulation and control of Internet-type databases and information; and that such software is intended to be included as part of this invention.

As used herein, "data processor" means a computer processor such as a Pentium™ processor or a PowerPC™ processor. Slower processors can be used, according to the invention, such as Intel 8086 processors.

These and other aspects and advantages of the invention are evident in the description which follows and in the accompanying drawings.

BRIEF DESCRIPTION OF THE DRAWINGS

A more complete understanding of the invention may be obtained by reference to the drawings, in which.

DETAILED DESCRIPTION OF THE INVENTION

Figure 1:
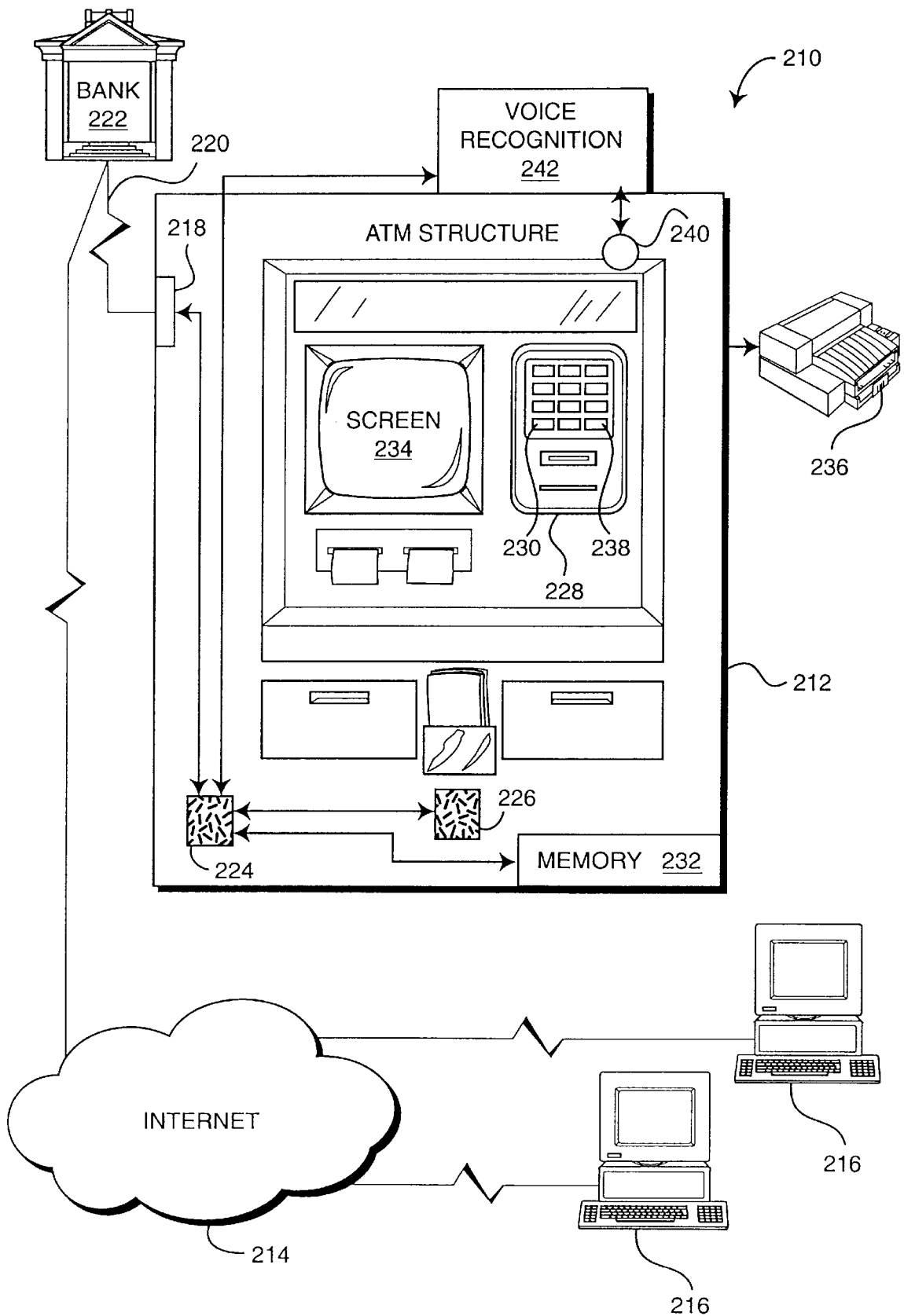
FIG. 1 illustrates an Internet access system constructed according to the invention.

FIG. 1 illustrates an ATM access system 210 constructed according to the invention. A support structure 212 houses or attaches to various objects and components. First and foremost, the ATM system 210 connects to the Internet 214, here shown as a continual loop connected to various computers 216 (or servers providing data to the ATM access system 210).

The ATM system 210 connects to the Internet 214 through a modem or dedicated communication card 218, such as known to those skilled in the art. For example, the ATM system 210 could be, and usually is, connected to an associated banking network 220 via such a modem or dedicated communication card 218. Accordingly, the Internet 214 can be accessed through a proprietary WAN 220 connecting the bank 222 to the ATM system 210, so that Internet 14 access is provided by first communicating with the bank 222. This then gives the bank 222 a method of controlling access to the Internet 214, through its ATM system 210.

Alternatively, the ATM system 210 can connect directly to the Internet 214.

The control of the ATM system 210 is primarily through a local processor 224. The processor 224 performs normal functions of a prior-art ATM system; and additionally performs communication functions to facilitate communication with the Internet 214. For example, the PowerPC™ chip in Apple MacIntosh™ computers controls the interface with commercial modems to provide Internet access. Likewise, in system 10, the processor 224 provides a similar service. Those skilled in the art will appreciate that other processors can be present within the structure 212 to provide additional functionality and/or control. Typically, for example, the processor 224 will operate solely to provide for communication access with the Internet 214; and a dedicated ATM processor 226, such as known to those skilled in the art, provides overall process control as to ATM transactions and interfacing with users at the ATM system 210. According to this embodiment, the processor 224 connects for communication with both the modem 218 and the ATM processor 226.

The ATM system 210 has a keyboard 228 that provides a normal user interface to both ATM transactions and the access to the Internet 214. By pressing the "Web Access" key 230, for example, the user at the system 210 can access the WWW 214. At that time, the system 210 loads web browser software out of memory 232 (or alternatively always has the web software running in the background), and the screen 234 takes on the familiar web surfing capability such as provided by Netscape™. The memory 232 can additionally house other software tools, such as modem interfacing software, fax software, and the like, all of which is commercially available. For example, in accord with the invention, a user can get a printout of the desired user locations, on printer 236, by pressing the print key 238. In this way, a user at the station 210 can acquire map or location information in hard-copy form. By way of example, a user selecting information from the web 214 about a selected group of items of interest in a geographic vicinity can acquire directions, from the ATM system 210, to the desired locations. Preferably that information is in map form; though it could be in textual form.

The ATM system 210 is powered by local power connections such as typical in ATM systems.

As discussed above, the system 210 can include a microphone and speaker subsystem 40 that communicates with a voice recognition subsystem 242, which in turn communicates with the processor 224 so as to provide inputs and outputs to users who do not use the keyboard 228. For example, a user of system 10 says "Web Access" and the processor 224 takes over the screen 234 so as to provide WWW 214 access. The user can then say, for example, "sandwich shops within 1 block of this location." At which time, the processor 224 communicates with the database 50 (such as described in connection with the database 12 of FIG. 1), and information about the sandwich shops within about one block of the ATM system 210 is shown on the screen 234 and/or relayed to the speaker 240 for audible notification.

In one embodiment of the invention, the processor 224 keeps track of the users response times to certain standard Internet access commands and movement; and adjusts the data rate between the Internet 214 and the user at the display 234. In this way, for users who are relatively slow to grasp Internet connectivity, the system 10 adjusts the datarate through the modem 218 so as to match the user, thereby potentially freeing up needed bandwidth on the Internet 214.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. Automatic teller machine system for providing access with the Internet, comprising:

an automatic teller machine for dispensing cash to individuals and for connecting the individuals to banking institutions;

user interface means connected with the machine for accepting user commands including internet access commands;

communication means for connecting the system, datawise, to the Internet;

local processor means, connected with the machine, the user interface and the communication means, for providing communicative access with the Internet and in response to the commands;

display means for displaying Internet data to a user of the system;

and a web access key for pressing by a user of the system, the local processor means being responsive to the web access key to initiate communications with the Internet.

2. Automatic teller machine system for providing access with the Internet, comprising:

an automatic teller machine for dispensing cash to individuals and for connecting the individuals to banking institutions;

user interface means connected with the machine for accepting user commands including internet access commands;

communication means for connecting the system, datawise, to the Internet;

local processor means, connected with the machine, the user interface and the communication means, for providing communicative access with the Internet and in response to the commands;

display means for displaying Internet data to a user of the system; and memory for storing web browsing software.

3. Automatic teller machine system according to claim 2, further comprising web software loaded into the memory so that a user can surf the Internet at the system.

4. Automatic teller machine system for providing access with the Internet, comprising:

an automatic teller machine for dispensing cash to individuals and for connecting the individuals to banking institutions;

user interface means connected with the machine for accepting user commands including internet access commands;

communication means for connecting the system, datawise, to the Internet;

local processor, connected with the machine, the user interface and the communication means, for providing communicative access with the Internet and in response to the commands;

display means for displaying Internet data to a user of the system; and web surfing software for control by the local processor, the web surfing software running in background operations at the machine such that users of the system can surf the Internet by commanding access to the Internet at the user interface.

5. Automatic teller machine system for providing access with the Internet, comprising:

an automatic teller machine for dispensing cash to individuals and for connecting the individuals to banking institutions;

user interface means connected with the machine for accepting user commands including internet access commands;

communication means for connecting the system, datawise, to the Internet;

local processor means, connected with the machine, the user interface and the communication means, for providing communicative access with the Internet and in response to the commands;

display means for displaying Internet data to a user of the system;

print command means and a printer, each connected to the machine, for printing information acquired on the Internet; and means for receiving and printing the information in the form of a map identifying items of interest in a geographic vicinity.

6. Automatic teller machine system for providing access with the Internet, comprising:

an automatic teller machine for dispensing cash to individuals and for connecting the individuals to banking institutions;

user interface means connected with the machine for accepting user commands including internet access commands;

communication means for connecting the system, datawise, to the Internet;

local processor means, connected with the machine, the user interface and the communication means, for providing communicative access with the Internet and in response to the commands;

display means for displaying Internet data to a user of the system; and a voice recognition subsystem for accepting voice inputs from users of the system and which converts the inputs to usable commands for the local processor means, thereby facilitating access to the Internet through voice commands.

7. Automatic teller machine system according to claim 6, further comprising a microphone and speaker subsystem for interfacing with the voice recognition subsystem.

8. Automatic teller machine system according to claim 7, further comprising means for providing audio information through the microphone and speaker subsystem.

9. Automatic teller machine system according to claim 8, wherein the means for providing comprises means for providing audio information including directions to one or more items of interest.

10. Automatic teller machine system for providing access with the Internet, comprising:

an automatic teller machine for dispensing cash to individuals and for connecting the individuals to banking institutions;

user interface means connected with the machine for accepting user commands including internet access commands;

communication means for connecting the system, datawise, to the Internet;

local processor means, connected with the machine, the user interface and the communication means, for providing communicative access with the Internet and in response to the commands;

display means for displaying Internet data to a user of the system; and means for adjusting the data rate to the display to correspond to user responsiveness at the user interface.

11. A method for accessing the Internet through an automatic teller machine, comprising the steps of:

providing an automatic teller machine for dispensing cash to individuals and for connecting the individuals to banking institutions;

accepting user commands at a user interface connected with the machine, the command including internet access commands;

connecting the system, datawise, to the Internet through a local processor and communication card connected with the machine;

utilizing Internet browser software in response web access commands by the user;

responding to user commands at the user interface to access and surf the Internet; and displaying Internet data at the machine.

* * * * *